United States Patent [19]

Taig

[11] 4,377,549
[45] Mar. 22, 1983

[54] METHOD FOR FINISH FORMING THERMOPLASTIC SURFACES

[75] Inventor: Alistair G. Taig, South Bend, Ind.
[73] Assignee: The Bendix Corporation, Southfield, Mich.
[21] Appl. No.: 262,352
[22] Filed: May 11, 1981
[51] Int. Cl.³ .............................................. B29C 13/00
[52] U.S. Cl. .................................... 264/320; 264/319; 264/338
[58] Field of Search ........................ 264/319, 320, 338
[56] References Cited
U.S. PATENT DOCUMENTS 3,481,755 12/1969 Gould .................................. 264/320
3,947,539 3/1976 Lane .................................... 264/320
4,073,853 2/1978 Chestnov ............................ 264/320
4,102,975 7/1978 Doerer ................................ 264/320
4,175,106 11/1979 Clarke et al. ....................... 264/120
4,304,751 12/1981 Li et al. ............................... 264/338
4,312,672 1/1982 Blahak et al. ....................... 264/338

Primary Examiner—Donald E. Czaja
Assistant Examiner—W. Thompson
Attorney, Agent, or Firm—Paul David Schoenle; Ken C. Decker

[57] ABSTRACT

A method of finish forming thermoplastic surfaces wherein a die having a finishing surface complementary in contour to and conforming in surface finish to the selected contour and surface finish of the thermoplastic surface is heated to a temperature between the softening and melting temperatures of the thermoplastic. The finishing surface of the die is pressed against the thermoplastic surface so that the thermoplastic is softened and flows to conform precisely to the contour and surface finish of the finishing surface of the die.

1 Claim, 9 Drawing Figures

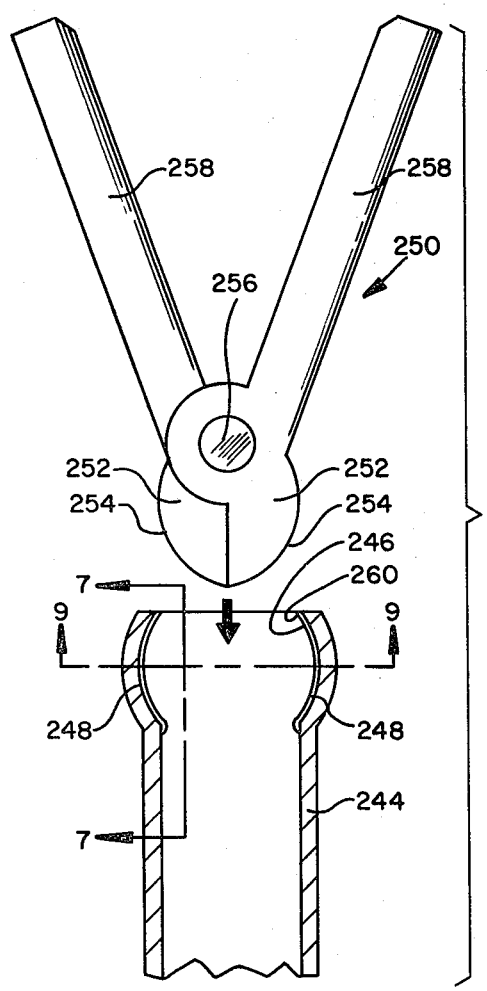
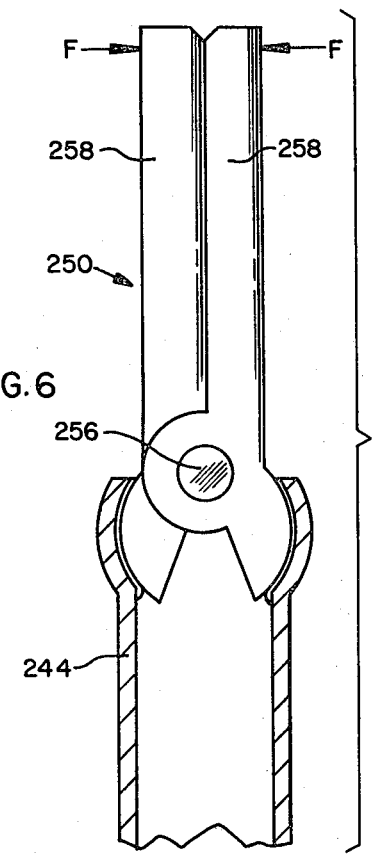
FIG. 6
FIG. 8
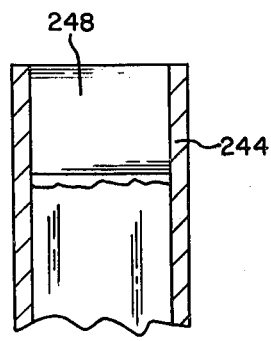
FIG. 7
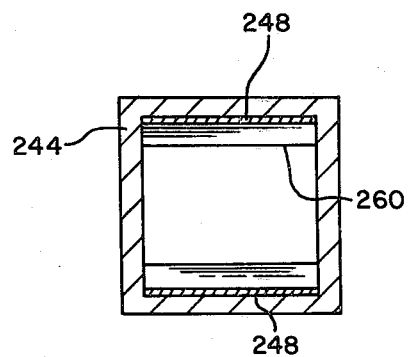
FIG. 9

METHOD FOR FINISH FORMING THERMOPLASTIC SURFACES

The invention relates to a method for finish forming thermoplastic surfaces wherein an article having a thermoplastic surface is placed in a cavity defined by cooperating dies. The cooperating dies are heated to a temperature greater than the softening temperature and less than the melting temperature of the thermoplastic. Pressure applied by the dies to the thermoplastic surface causes the thermoplastic to conform to the shape and surface finish of the dies. Consequently, when the article is cooled the thermoplastic surface precisely conforms to the shape and surface finish of the dies.

The method for finish forming thermoplastic surfaces according to the invention is particularly applicable to the thermoplastic surfaces of metal articles which have a thermoplastic coating on a portion thereof. Thermoplastic coating of metal articles is commonly used for cosmetic purposes, to provide surface protection for the metal article, or to provide a wear or abrasion resistant coating on the article. When the thermoplastic coating is required to provide a low coefficient of friction, the thermoplastic surface of the coating is sometimes machined to obtain a good surface finish for the article. Machining of the thermoplastic surface is also employed to achieve accurate dimensions for the article. However, machining of a surface is an expensive manufacturing process and adds a significant expense to the manufacturing costs for the article. Additionally, where a low coefficient of friction is required, machining of the thermoplastic surface with a single-point tool is undesirable because thermoplastics tend to tear rather than to shear. Consequently, the machined surface of a thermoplastic comprises a multitude of minute tears, the edges of which can grab a contiguous surface rather than allowing the surface to slide smoothly relative to the thermoplastic surface. Further, machining of a thermoplastic surface on an article is sometimes impracticable because of the configuration of the article.

The invention as claimed is intended to avoid the drawbacks of prior methods of finish forming thermoplastic surfaces by providing a method wherein a precisely contoured, heated die having the desired surface finish is pressed against the thermoplastic surface. The temperature of the die is controlled between the softening and melting temperatures of the thermoplastic so that the thermoplastic surface flows to conform to the contour and surface finish of the die.

The advantages offered by the invention are mainly that a good surface finish which is superior to a machined surface, is obtained on a thermoplastic surface at a cost far less than the cost of machining; the dimensions and contour of the finished article precisely match the die so that a multitude of substantially identical articles can be produced using the die.

Three ways of carrying out the invention are described in detail below with reference to drawing figures which illustrate only these three specific embodiments, in which:

FIG. 6-9 are fragmentary cross-sectional views of yet another article having a thermoplastic surface therein and illustrating the finish forming of the thermoplastic surface.

Figure 1:
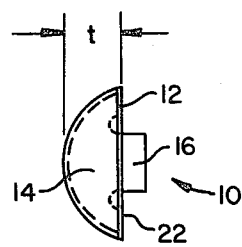
FIGS. 1-3 are orthographic views of an article having a thermoplastic surface thereon.
Figure 2:
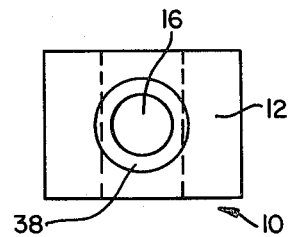
Figure 3:
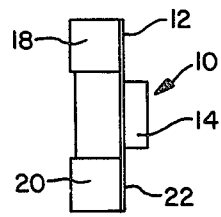

FIGS. 1-3 illustrate an article 10 having a thermoplastic coating 12 on one face thereof. The article 10 is a component part for an assembly (not shown) and includes a portion 14 formed of sintered iron. The thermoplastic coating 12 is applied to the metal portion of the article by masking the portions of the article which are not to be coated and immersing the heated article into a fluidized bed of thermoplastic granules. Alternatively, the coating may be applied to the article by spraying electrostatically charged thermoplastic granules onto the article. In either case, the thermoplastic granules adhere to the heated article and aggregate to form a thermoplastic coating on the unmasked portions of the article.

The article 10 includes a pintle shaft 16 extending therefrom. The pintle shaft 16 is rotatably received in a bore defined by another part of the assembly. A pair of part-cylindrical surfaces 18 and 20 defined by the article 10 slidably engage yet another component part of the assembly. Consequently, the article 10 comprises a force-transmitting shoe in the assembly. The surface 22 of the thermoplastic coating engages the part receiving the pintle shaft 16 so that the thermoplastic coating serves as a thrust bearing for the shoe 10.

In order for the shoe to operate properly in the assembly, the thickness of the shoe, represented by the dimension t, viewing FIGS. 1 and 3, must coincide with a selected dimension. Because the metal portion 14 of the shoe is made of sintered metal, its dimensions are not precisely controllable. Similarly, the thickness of the thermoplastic coating 12 is not precisely controllable so that the thickness of the shoe (dimension t) is subject to considerable variation. Further, the surface of the plastic coating 12, whether made by fluidized bed or electrostatic spraying, is not sufficiently smooth to operate properly as a thrust bearing surface.

Figure 4:
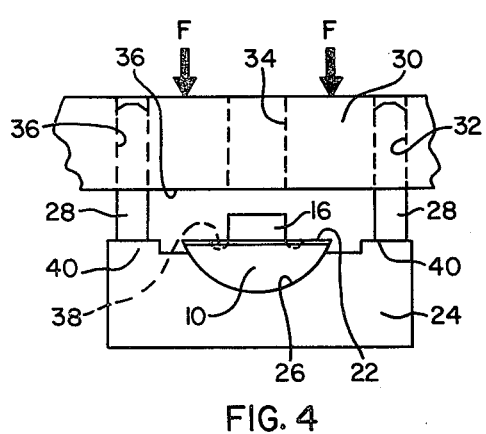
FIG. 4 illustrates the finish forming of the thermoplastic surface on the article illustrated in FIGS. 1-3.

FIG. 4 illustrates how the method for surface finishing thermoplastic surfaces according to the invention is employed to obtain a smooth surface finish on the thermoplastic surface 22 and to obtain the desired thickness (dimension t) for the shoe 10. The thermoplastic coating 12 is applied to the shoe portion 14 so that the thickness of the shoe exceeds the desired dimension. A holding die 24 defines an arcuate recess 26. The shoe 10 is received in the recess 26 and supported at the part-cylindrical surfaces 18 and 20. The holding die includes a pair of upwardly projecting guide rods 28. A presser die 30 defines a pair of guide bores 32 slidably receiving the guide rods 28 so that the presser die is movably received on the guide rods 28. A bore 34 in the presser die 30 is congruent with the pintle shaft 16 of the shoe 10 when the shoe is received in the recess 26. Consequently, the pintle shaft is receivable in the bore 34 and the presser die is engageable with the thermoplastic surface 22 of the coating 12. The lower or finishing surface 36 of the presser die 30 is ground or lapped to obtain a very smooth finish on this surface. The presser die 30 is heated to a temperature higher than the softening temperature and lower than the melting temperature of the thermoplastic coating 12. A release agent is applied to the surface 36 of the presser die. For example, a colloidal suspension of polytetrafluoroethylene in a liquid fluoronated hydrocarbon "carrier" has been found to prevent the thermoplastic from sticking to the heated presser die 30. A downwardly directed force F is applied to the presser die 30 so that the surface 36 of the presser die is urged into engagement with the surface 22 of the coating 12. As the plastic coating 12 is heated because of contact with the heated presser die 30, the thermoplastic flows because of the force F applied to the presser die. As the softened plastic coating flows, it conforms to the surface of the presser die 30. Further, the presser die moves downwardly, viewing FIG. 4, as the plastic coating 12 assumes a uniform thickness. As the presser die 30 moves downwardly, excess thermoplastic flows radially to the outer edges of the coating 12 and also into an annular recess 38 defined by the metal portion 14 around the pintle shaft 16. In order to prevent the presser die 30 from moving too far downwardly, the holding die 24 includes a pair of upwardly extending shoulders 40 which engage the surface 36 of the presser die. The height of the shoulders 40 is correlated with the depth of the recess 26 in the holding die so that when the presser die 30 contacts the shoulders 40, the thickness of the shoe 10 precisely corresponds to the selected dimension.

Those skilled in the art to which the invention pertains will recognize that the preferable time to perform the surface finishing operation according to the invention is immediately after the thermoplastic coating 12 has been applied to the metal portion 14. In this way, the metal portion 14 and thermoplastic coating 12 will be warm so that the surface forming operation proceeds rapidly and a lesser expenditure of energy is needed to maintain the presser die 30 at a selected temperature. Of course, in situations where circumstances prevent the finish forming operation from being preformed soon after the thermoplastic coating is applied to the article, the article can later be rewarmed to a termperature near the softening temperature of the thermoplastic so that the finish forming operation is expedited.

Figure 5:
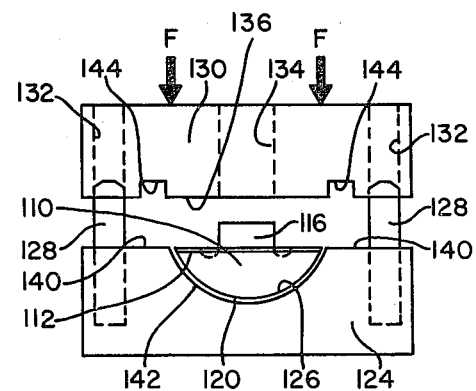
FIG. 5 illustrates an alternative embodiment of the invention wherein an article similar to the article illustrated in FIGS. 1-4 has a pair of thermoplastic surfaces, both of which are finish formed.

FIG. 5 illustrates an alternative embodiment of the invention wherein a shoe 110, similar to the shoe 10 illustrated by FIGS. 1-4, has a pair of thermoplastic surfaces thereon. In order to obtain reference numerals for use in FIG. 5, features of the embodiment illustrated in FIG. 5 which are analogous to features illustrated in FIGS. 1-4 are referenced by the numeral used in FIGS. 1-4 and increased by 100.

Inspection of FIG. 5 will reveal that the shoe 110 is substantially similar to the shoe 10 illustrated in FIGS. 1-4. However, the shoe 110 has a thermoplastic coating 142 on both of the part-cylindrical surfaces 118 and 120 in addition to the coating 112 on the surface surrounding the pintle shaft 116.

In order to finish form the thermoplastic coatings 112 and 142, a holding die 124 is provided with a recess 126 which is complementary in shape and conforms in surface finish to the desired surface finish for the surfaces of the coatings 142 on the part cylindrical surfaces 118 and 120. A presser die 130 is provided which is substantially the same as the presser die 30 with the exception that the die 130 defines a pair of channels 144 for receiving excess thermoplastic during the surface finishing operation.

The holding die 124 and the presser die 130 are both heated to a temperature between the softening and melting temperature of the thermoplastic coatings 112 and 142. A release agent is applied to the recess 126 and to the surface 136. The shoe 110 is received in the recess 126 and a downwardly directed force F is applied to the presser die 130. The thermoplastic coatings 112 and 142 are heated and flow to conform in shape and surface finish to the cavity 126 and surface 136. The holding die 124 defines an upper abutment surface 140 which is engaged by the surface 136 of the presser die 130 so that the finished thickness of the shoe 110 is precisely determined by the depth of the cavity 126 in the holding die 124.

FIGS. 6-9 illustrate an article 244 which is elongated, tubular, and rectangular in transverse cross section, viewing FIG. 9. The article 244 defines a part-cylindrical cavity 246 the arcuate walls of which are covered by a thermoplastic coating 248. In order to finish form the thermoplastic coating 248, a presser die 250 is provided with expansible jaws 252 having arcuate surfaces 254. The jaws 252 are pivotally connected to each other by a pivot pin 256 and each jaw includes an elongated lever 258 which is angulated relative to the respective jaw. When the jaws 252 are pivoted into engagement with each other, as illustrated in FIG. 6, the jaws of the presser die will pass through the opening 260 defined by the article 244 and into the cavity 246. The presser die jaws 252 are heated to a temperature between the softening and melting temperatures of the thermoplastic coating, coated with a release agent, and inserted into the cavity 246. A force F is applied to the levers 258, as illustrated by FIG. 8, so that the jaws 252 pivot away from each other and into engagement with the thermoplastic coating 248.

In order to control the finish forming of the thermoplastic surfaces 248, the angulation of the levers 258 relative the jaws 252 is selected so that when the levers 258 engage each other, the surfaces of the coatings 248 bounding the cavity 246 define the desired contour. Of course, the jaws of the presser die are removable from the cavity 246 by pivoting the jaws into engagement with each other and withdrawing the jaws from the cavity.

I claim:
1. A method for forming a thermoplastic coating on an article comprising the steps of:
  (a) providing the article with the thermoplastic coating on the outer surface thereof, said thermoplastic coating being applied to said article when said article is heated and in excess of the desired coating for a finished surface for said article, and said article being provided with a recess partially filled with said thermoplastic coating;
  (b) providing a die having a finishing surface thereon which is complementary to the contour for said article;
  (c) heating said finishing surface to a temperature between the softening and melting temperatures of said thermoplastic coating;
  (d) pressing said finishing surface against said thermoplastic coating to cause said thermoplastic coating to flow within a clearance defined between said finishing surface and said article, and the excess thermoplastic coating flows to said article recess to substantially fill the latter whereby a uniform thickness of thermoplastic coating is provided over said article apart from said recess in order to define a finished surface for said thermoplastic coating.

* * * * *